United States Patent [19]

Smith, Jr. et al.

[11] Patent Number: 4,990,774
[45] Date of Patent: Feb. 5, 1991

[54] TECHNIQUE FOR OBTAINING HIGH VERTICAL RESOLUTION FORMATION CAPTURE CROSS SECTIONS FROM PULSED NEUTRON LOGS

[75] Inventors: Harry D. Smith, Jr.; Dennis F. Wyatt, Jr., both of Houston; Michael P. Smith, Spring, all of Tex.

[73] Assignee: Halliburton Logging Services Inc., Houston, Tex.

[21] Appl. No.: 363,009

[22] Filed: Jun. 8, 1989

[51] Int. Cl.$^5$ ............................................. G01V 5/10
[52] U.S. Cl. .................................... 250/269; 250/266; 250/270
[58] Field of Search ................ 250/266, 267, 269, 270

[56] References Cited

U.S. PATENT DOCUMENTS

| | | | |
|---|---|---|---|
| 4,350,888 | 9/1982 | Peelman | 250/270 |
| 4,388,529 | 6/1983 | Peelman | 250/270 |
| 4,394,574 | 7/1983 | Grau et al. | 250/262 |
| 4,409,481 | 10/1983 | Smith, Jr. et al. | 250/270 |
| 4,424,444 | 1/1984 | Smith, Jr. et al. | 250/270 |
| 4,600,838 | 7/1986 | Steinman et al. | 250/270 |
| 4,625,111 | 11/1986 | Smith, Jr. | 250/270 |
| 4,712,007 | 12/1987 | Ondrik | 250/270 |
| 4,786,796 | 11/1988 | Flaum et al. | 250/266 |

OTHER PUBLICATIONS

Enhanced Vertical Resolution Processing of Dual Detector Gamma-Gamma Density Logs—6/87—Flaum and Glaford.
Enhanced Resolution Processing of Compensated Neutron Logs—June 1989; Galford, Flaum et al.

*Primary Examiner*—Constantine Hannaher
*Assistant Examiner*—Edward J. Glick
*Attorney, Agent, or Firm*—William J. Beard

[57] ABSTRACT

Improved vertical resolution from pulse neutron logs is obtained by the disclosed process; a pulse of fast neutrons is emitted from a source and counts are taken at near and far dectors. This is done repetitively so that the interval between neutron bursts is conveniently divided into a number of gates, the preferred form being six contiguous gates. The count rate especially in gates 3-6 is obtained and is processed in a modified form to thereby enhance vertical resolution. While before vertical resolution was dependent in part in spacing of the detectors and source, improved vertical resolution is obtained to thereby locate thin beds which would otherwise be obscured.

14 Claims, 4 Drawing Sheets

A = BRINE FILLED 7" CASING

B = BRINE/OIL FILLED 7" CASING

C = 2 7/8" TUBING + 7" CASING

TECHNIQUE FOR OBTAINING HIGH VERTICAL RESOLUTION FORMATION CAPTURE CROSS SECTIONS FROM PULSED NEUTRON LOGS

BACKGROUND OF THE DISCLOSURE

This invention relates to in situ measurements of earth formations traversed by a well borehole. More particularly the invention relates to the measurement of thermal neutron decay time or neutron lifetime of earth formations in the vicinity of a well borehole and of the borehole itself.

In recent years, an improved well logging system for measuring simultaneously the thermal neutron decay components of the earth formations in the vicinity of a well borehole and the borehole component itself had been introduced. U.S. Pat. No. 4,409,481 which is assigned to the assignee of the present invention and which is incorporated by reference herein in its entirety describes the most successful commercial system for making such simultaneous measurements. Briefly in the invention described in the U.S. Pat. No. 4,409,481, a well logging tool is moved through a borehole which includes a pulsed source of fast neutrons and two radiation detectors. The pulsed neutron source generates a pulse of neutrons of approximately 14 Mev energy for a duration of between 10 and 150 microseconds at a pulse rate of approximately 1,200 pulses per second. The neutrons are introduced into the media comprising the well borehole and the surrounding earth formations and result in a thermal neutron population being generated from the slowing down of the fast neutrons in the earth formation media and in the borehole media. After a very short pause to allow moderation of the fast neutrons following the neutron pulse, the detectors are gated on and capture gamma radiation resulting from the capture of thermal neutrons in the borehole and the earth formations in the vicinity of the borehole are measured essentially continuously until the next neutron burst is about to begin. Multiple time gates which occur during this essentially continuous interval are used for this purpose. In the U.S. Pat. No. 4,409,481, the use of six such time gates is described. The gates, being essentially contiguous in time and of variable length, have the shorter gates closer to the neutron pulse and the longer duration gates being further removed in time from the neutron pulse.

The contiguous nature of the gates tends to reduce statistical errors, but neither the number of or continuous nature of the gates are essential to this invention, so long as the number and position of gates are adequate to provide data to solve for the desired components. The multiple time gate measurements of the counting rates of the gamma rays measured in each gate are supplied to a thermal neutron lifetime computer which computes formation and borehole neutron lifetime components by means of an iterative least squares fitting technique of the count rate data taken during four or more of the time gates following each neutron burst. The thermal neutron lifetime computer is enabled to calculate both the borehole thermal neutron lifetime component and the earth formation thermal neutron lifetime component simultaneously, and also simultaneously can compute the magnitude of the initial borehole and initial formation neutron components of thermal neutron population.

Approximately once per second and for approximately 5% of the one second operating cycle, the neutron source pulsing sequence is turned off completely and the detectors are used to establish any relatively long lived background counting rate due to source neutron induced gamma ray activity within the gamma ray detector, the formation, the borehole, the logging sonde or any natural gamma radiation in the vicinity of the borehole. This background gamma radiation information is then properly normalized and subtracted from the count rates made in each of the time gates following the neutron bursts. The percentage of the one second cycle used for background can be varied but the approximate 5% amount mentioned has been found to be suitable for this purpose.

A problem which has arisen due to the statistical nature of the measurement of the gamma rays generated by captured thermal neutrons has been that certain mathematical filtering techniques must be applied both to the raw measurement data prior to the data processing and then to the computed thermal neutron decay time or lifetime parameters for both the borehole and the formation which are produced by the logging system described previously. Moreover, the detectors in the system described for thermal multigate decay time logging are spaced as close as conveniently possible to the neutron source in the downhole logging instrument but, because of the relatively small diameter of the logging instrument, the near detector is spaced a distance of approximately 12 inches from the neutron source and the far detector is approximately 12 inches further from the neutron source than the near detector. A rough rule of thumb of vertical resolution of a logging instrument is that resolution is proportional to the distance between the source and the detector simply because of the physics of source propagation (of most types) and the received stimulus observed by the detector. This is not strictly true in the instance of pulsed neutron logging tools such as the thermal multigate decay log in that the vertical resolution of the long spaced detector is not quite twice that of the short spaced detector, but both have resolutions in the range of 18-30 inches.

It is thus seen that, because of the statistical count data filtering and the spacing of source to detectors in the thermal multigate decay time logging system, vertical resolution on the order of 4 to 5 feet is to be expected with the conventionally processed data from this type of logging device. Because of the commercial realities of life, however, it is becoming more important to be able to evaluate thin bed stringers inside of shaley sand formations for potential hydrocarbon production. Higher vertical resolution than the 4 to 5 feet resolution provided by conventionally processed data from the logging instrument in a thermal multigate decay system is quite desirable. In the present invention, such higher resolution is provided by unique processing techniques which are based upon the physics of the measurement, but which employ mathematical processing techniques in their implementation to improve the vertical resolution offered by the measuring instrument and processing software.

BRIEF DESCRIPTION OF THE INVENTION

Common practice to gain improved resolution for cased hole pulsed neutron logs has been to reduce or to eliminate filtering applied to the measured data from the detectors. While this does improve vertical resolution, it increases the statistical uncertainty to a level which is potentially undesirable in the acquired log. In the present invention, a technique is developed that makes use of the strong correlation between the formation cross section $\Sigma_F$ derived from the thermal multigate decay log processing and the overall system count rate. The count rate curve from, for example, gates 3 through 6 is much more repeatable than has been observed from the curve for $\Sigma_F$. Hence, a $\Sigma$ derived from the count rate curve will have less statistical variation than a $\Sigma_F$ curve produced from the raw unfiltered detector counts. It has been discovered that an unfiltered $\Sigma_F$ based on the gate 3 through 6 count rate of the thermal multigate decay log system has adequate repeatability for use directly in thin bed analysis. The gate 3 through 6 count rate, however, also varies with changes in borehole conditions as is noted in the aforementioned U.S. patent covering the thermal multigate decay log. It also varies with neutron generator output. Therefore, in the present invention a normalization procedure is used to correct for these non-formation cross section induced characteristics which may be termed a normalization procedure. The mathematical technique uses a continuous normalization of the $\Sigma_F$ derived from the unfiltered gate 3 to 6 count rate to the conventionally derived and filtered $\Sigma_F$ from standard thermal multigate decay logging processes. This procedure can yield a high resolution formation capture cross section $\Sigma_{HR}$ curve in which the statistical uncertainties are reduced to levels comparable to the standard filtered $\Sigma_F$ log but having a better thin bed resolution characteristic.

The invention is best understood by reference to the following detailed description thereof when taken in conjunction with the accompanying drawings.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is a simplified flow diagram illustrating computational sequences for improving vertical resolution according to the concepts of the present invention.

DESCRIPTION OF THE PREFERRED EMBODIMENT

It will be recalled that the thermal multigate decay logging system of U.S. Pat. No. 4,409,481 assumes that the thermal neutron population in the vicinity of a well borehole following a burst of high energy neutrons may be described as the sum of a formation component, a borehole component and a background component. This may be expressed mathematically as set out in Equation 1:

$$C(t) = A_B e^{-t/\tau_B} + A_F e^{-t/\tau_F} + C_B \quad (1)$$

where $C(t)$ is the count rate at any time t measured from a reference time; and $A_B$ and $A_F$ are constants which may be interpreted as $A_F$ being the initial amplitude of the formation component, $A_B$ representing the initial amplitude of the borehole component and wherein $C_B$ represents the background component.

In Equation (1) $\tau_B$ and $\tau_F$ represent the borehole and formation components of thermal neutron decay time, respectively.

The formation cross section $\Sigma_F$ and $\Sigma_B$ are reciprocally related to the formation and borehole decay times as given in Equation 2:

$$\tau = 1/v\Sigma \quad (2)$$

where v represents the velocity of thermal neutrons, and $\tau$ and $\Sigma$ are defined previously.

It will be further be recalled that the thermal multigate decay system of U.S. Pat. No. 4,409,481 measures the count rates of gamma rays resulting from the decay of nuclei formed by the capture of thermalized neutrons in the borehole and in the earth formation surrounding the borehole in six essentially contiguous time gates following each pulse of fast neutrons generated by the neutron generator. These count rates are then combined according to a predetermined mathematical relationship which involves the iterative solution of the exponential decay model given in Equation 1 by iterative techniques to obtain a borehole $\Sigma_B$ and a formation $\Sigma_F$ at each of the near and far detectors of the well logging tool.

Figure 3:
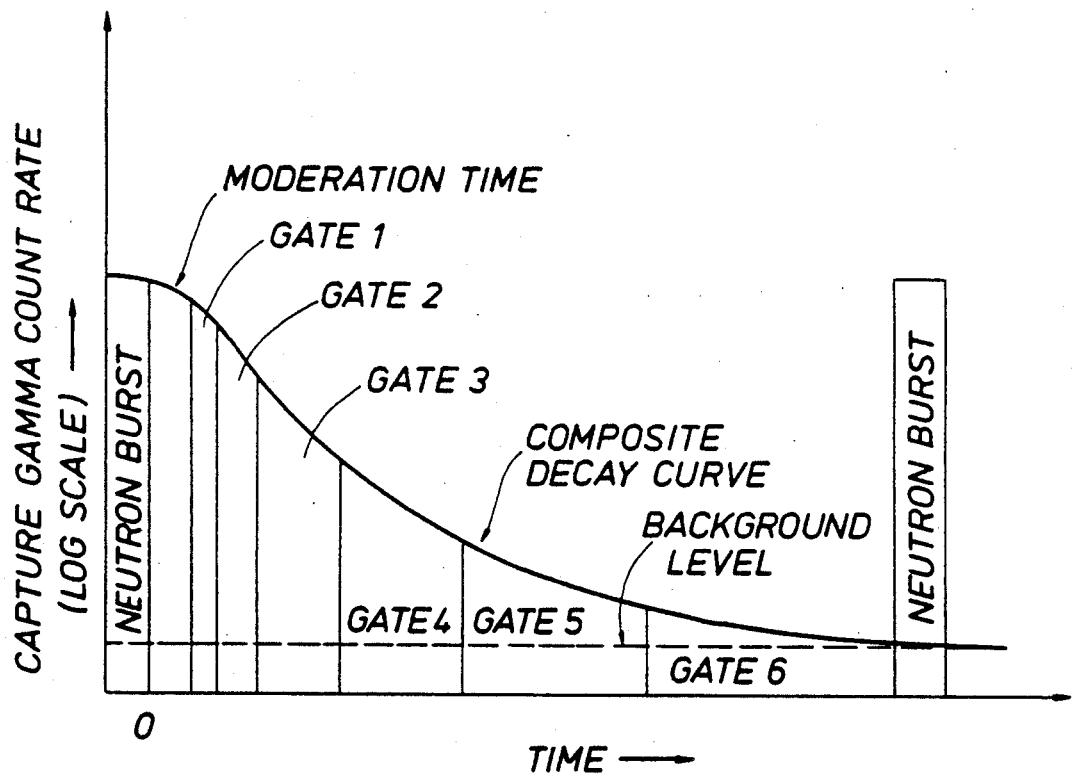
FIG. 3 is a graphical relationship illustrating a composite thermal neutron population decay curve and time gates according to an embodiment of the present invention.

The time gating arrangement of the thermal multigate decay logging system is illustrated schematically in FIG. 3. A fast neutron burst is first emitted and six essentially contiguous gates, labeled 1 through 6 in FIG. 3, follow each neutron burst up to the beginning of the next neutron burst. The gates closer in time to the neutron burst are narrower in time, and the gates farther away are wider in time. This is to provide as nearly as possibly by first approximation equal counting statistics for data from each of the six gates with the gates positioned as shown in FIG. 3. It will be observed that the portion of the composite decay curve which may be approximated by the formation component exponential expression in Equation 1 is nearly a straight line on the logarithmic vertical axis of FIG. 3. That is to say, if a sufficient time has elapsed after the neutron burst prior to the opening of gate 3, the gates 3, 4, 5 and 6 will contain primarily formation and background components, with only a modest contribution from the borehole component of the thermal neutron decay. It is also possible that the background component can be removed by using a subtraction technique well known in the art. The present invention exploits these features in making an approximation to be described.

Figure 1:
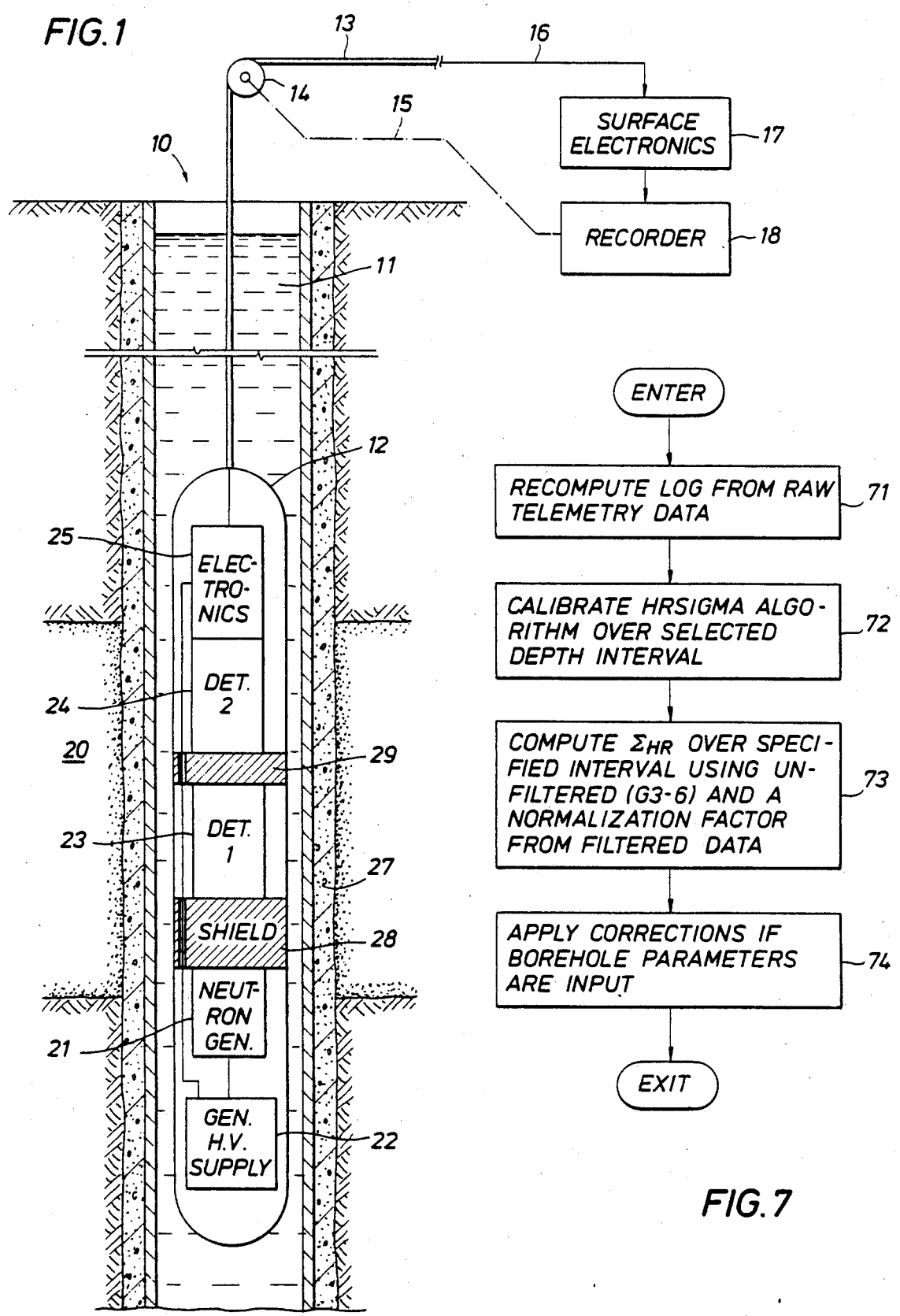
FIG. 1 is a schematic drawing showing a well logging system in accordance with concepts of the present invention.

Referring now to FIG. 1, a well logging system for performing thermal multigate decay time logging in accordance with the concepts of the present invention is illustrated schematically. A well borehole 10 is filled with a borehole fluid 11 and penetrates earth formations 20 to be investigated. A downhole well logging sonde 12 is suspended in the borehole 10 from a conventional armored logging cable 13 in a manner known in the art. The sonde 12 may be raised and lowered through the borehole as desired. The well logging cable 13 passes over a sheave wheel 14 at the surface. The sheave wheel 14 is electrically or mechanically coupled as indicated by a dotted line 15 to a well logging recorder 18 which may comprise a strip chart recorder or a magnetic tape recorder or both as known in the art. The flow of measurements made by the downhole sonde 12 may thus be recorded as a function of the depth in the borehole of the well logging sonde 12.

In the downhole sonde 12, a neutron generator 21 is supplied with high voltage (approximately 100 kilovolts) for its operation by a high voltage power supply 22. Control and telemetry electronics 25 are utilized to supply control signals to the high voltage power supply and the neutron generator 21 and to telemeter information measured by the downhole instrument to the surface on conductors of the logging cable 13.

In the sonde 12, and spaced from the neutron generator 21, are two radiation detectors 23 and 24 which may comprise, for example, thalium activated sodium iodide crystals which are optically coupled to photomultiplier tubes. The detectors 23 and 24 serve to detect gamma radiation produced in the surrounding formations 20 resulting from the action of the neutron generator 21 in emitting neutrons. A neutron shielding material 28 having a high density matter content or large scattering cross section is interposed between the neutron generator 21 and the dual spaced detectors 23 and 24 in order to attenuate direct irradiation of the detectors by neutrons emitted from the generator 21. Shielding 29 may also be interposed between the detectors 23 and 24 if desired.

Upon activation of the neutron generator 21, a relatively short duration burst or pulse of neutrons of about 20 to 125 microseconds duration is initiated and is emitted into the well borehole 10 to pass through the borehole fluid 11, the steel casing 26 and cement layer 27 (assuming a cased well) surrounding the steel casing into the earth formations 20 being investigated. The neutron burst is rapidly moderated or slowed down by scattering interactions such that statistically essentially all the neutrons are at thermal energy in a relatively short time. The thermalized or thermal neutrons may then be captured by nuclei of constituents of the borehole 10 and the earth formations 20 and including the pore spaces contained in the earth formations.

The capture of neutrons by nuclei of elements comprising the borehole constituents 11, 26, 12 and 27 and the earth formations 20 and their pore spaces result in capture gamma rays which are emitted and impinge upon detectors 23 and 24. A voltage pulse is produced from the photomultipliers of detectors 23 and 24 for each gamma ray so detected. These voltage pulses are supplied to the electronics section 25 and are counted in a digital counter and then telemetered to the surface via conductors 16 of the well logging cable 13. At the surface, a surface electronics package 17 detects the telemetered information from the downhole sonde 12 and performs the iterative least squares fitting technique to determine the parameters $\Sigma_F$, $\Sigma_B$, $A_F$, and $A_B$, as previously described with respect to Equation 1. The surface electronics package then supplies signals representative of the measured quantities to the recorder 18 where they are recorded as a function of borehole depth.

Figure 2:
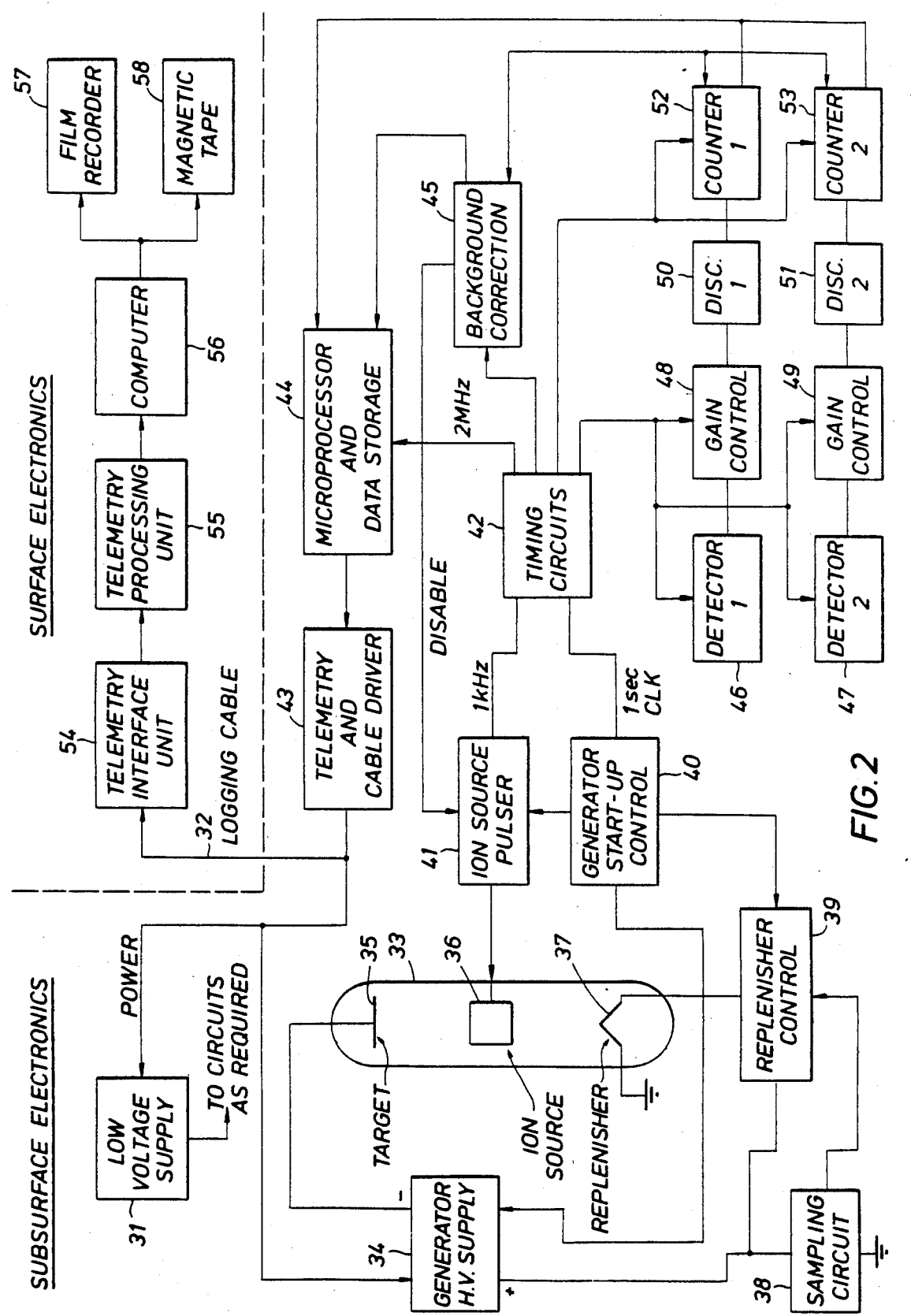
FIG. 2 is a schematic block diagram depicting an electronics system for the well logging system according to concepts of the present invention.

Referring now to FIG. 2, a schematic block diagram illustrates the electronics portion of the subsurface and surface electronic systems illustrated in more detail but still schematically. Power for the operation of the subsurface electronics is supplied by conductors of the well logging cable 32 to a conventional low voltage power supply 31 and a high voltage power supply 34. The high voltage power supply 34 may be of the Cockcroft Walton multistage type and it supplies approximately 100 kilovolts for the operation of the neutron generator tube 33. The neutron generator tube 33 is of the deuterium tritium accelerator type. An ion source 36, which is maintained at a potential near ground, is used to generate deuterium ions from a mixture of deuterium and tritium gas filling the envelope of tube 33. A replenisher heater 37 is impregnated with additional deuterium and maintains a pressure level of gas inside the tube 33 envelope sufficient to supply the ion source 36 with deuterium gas for ionization. A target 35 is impregnated with tritium and is maintained at a relatively high negative potential of 100 kilovolts. The ion source is controlled by an ion source pulser 41. When supplied with a relatively low level voltage pulse (2 kilovolts, for example), the ion source causes gas in the tube 33 envelope to become ionized and accelerated toward the target material 35. Upon impinging on the target material of target 35, the deuterium ions interact thermonuclearly with the tritium ions in the target to produce neutrons. The neutrons are emitted in a generally spherically, symmetrical fashion from the neutron generator tube 33 into the borehole 10 and surrounding earth formations 20 of FIG. 1.

A replenisher control circuit 39 is supplied with samples of the neutron generator target current by sampling circuit 38 and utilizes this to compare with a reference signal to control replenisher current and thereby the gas pressure in the envelope of the neutron generator tube 33. Timing circuits 42, which comprises a master timing oscillator operating at a relatively high frequency and an appropriate divider chain supply 1.25 kilohertz pulses to the ion source pulser 41 and also supply one second clock pulses to the neutron generator startup control circuit 40. Moreover, timing circuit 42 supplies 2.0 megahertz clock pulses to a micro processor and data storage array 44 and supplies timing pulses to the background circuit 45 and counters 52 and 53. Similarly timing signals are supplied to a pair of gain control circuits 48 and 49.

During the background portion of the detection cycle, background circuit 45 is supplied with counts from the counters 52 and 53. This circuit also provides a disable pulse to the ion source 41 to prevent pulsing of the neutron generator during the background counting portion of the cycle. The background correction circuit 45 supplies background count information to the microprocessor and data storage 44. The background may be stored and averaged for longer periods. Since there are low discriminator thresholds, most gamma ray background is from neutron activation of the iodine in the detector crystal which has a half life of 27 minutes, better statistics in the subtracted signal result. It will be noted that adaptive or other filtering can be applied to background as well as capture gates prior to executing the iterative program. It should also be noted that if background count rate is not significant during the count rate gates used in the computation of the high resolution $\Sigma_F$, then background correction may not be necessary to the implementation of this invention.

The digital count information from the counters 52 and 53 in the background correction circuit 45 are supplied to the microprocessor and data storage circuit 44. These circuits format the data and present it in a serial manner to the telemetry circuit 43 which is used to telemeter the digital information from the counters and background correction circuit to the surface by conductors along the logging cable 32. At the surface, a telemetry interface unit 54 detects the analog voltage signals from the logging cable 32 conductors and supplies them to a telemetry processing unit 55 which formats the digital count rate information representing the counting rate from counters 52 and 53 in the subsurface equipment in terms of the time gating scheme previously discussed with respect to FIG. 3.

Figure 4:
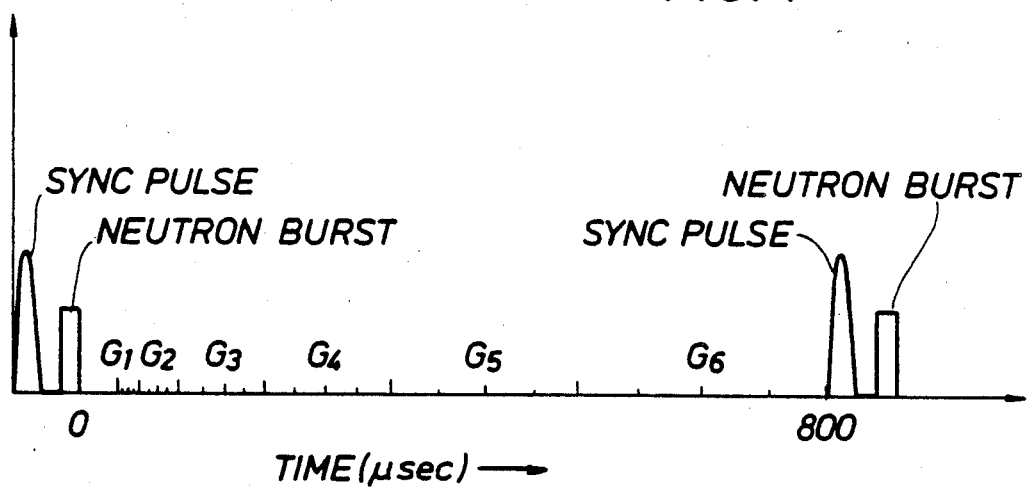
FIG. 4 is a graphical representation illustrating a telemetry sequence occurring as a function of time in connection with the present invention.

Referring now to FIG. 4, the telemetry stream just described along with synchronization or sync pulses is illustrated schematically. This would represent the voltage levels as seen on the conductors of the logging cable 32 of FIG. 2. A sync pulse preceding each neutron burst is sent and then a signal indicating the neutron burst is sent. Count rate signals representative of the signals in gates 1 through 6 illustrated in FIG. 4 is $G_1$ through $G_6$ then succeed as a function of time. These are digital numbers representative of the count rate summed over a plurality of counting intervals in each of the gates typically over a one second interval.

The digital numbers representative of the count rates are supplied to a computer 56 which is programmed to interpret the six time gates and the background counting rate information in terms of thermal neutron decay times, or lifetimes, of the borehole and formation components from each detector. Output signals representing the parameters of interest are supplied from the computer 56 to a film recorder 57 and a magnetic tape recorder 58 for recording as a function of borehole depth. The computer 56 is programmed in accordance with the techniques shown in U.S. Pat. No. 4,409,481 and to be subsequently described herein to perform the high resolution determination of the $\Sigma_F$. It should be noted that at this point the $\Sigma_F$ can be corrected for diffusion effects if desired. Further high resoltuion computations can be made with or without applying diffusion corrections, as desired.

HIGH RESOLUTION PROCESSING

Figure 5:
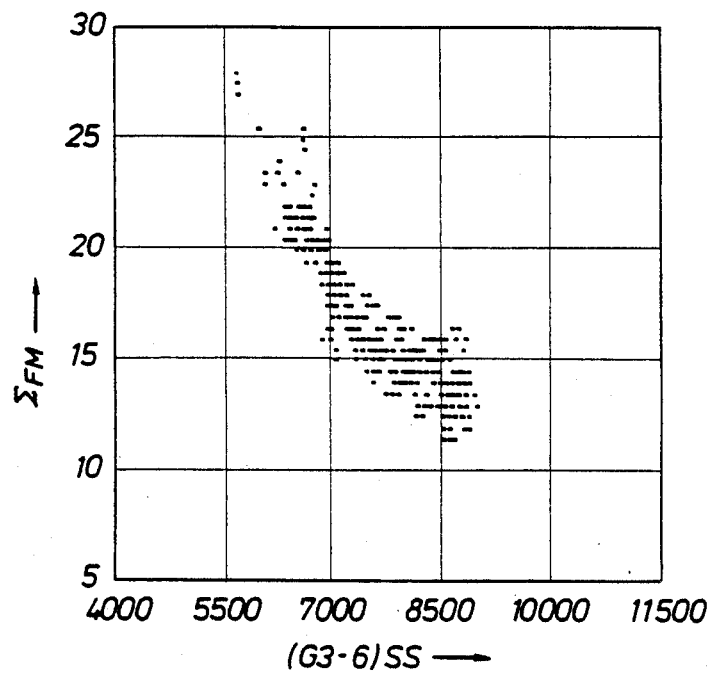
FIG. 5 is a graphical representation illustrating a cross-plot of short spaced gate 3 through 6 count rates versus $\Sigma_F$ in an interval having constant borehole conditions.

Experience in logging many wells with the thermal multigate decay logging system has shown that a relationship exists between the detector count rates of the near and far detectors and the formation capture cross section, at least in an approximate sense. This relationship, in spite of its inherent borehole sensitivity, can be exploited to improve the repeatability of high resolution capture cross section processing. Even though $\Sigma_F$ is obtained from the same count rates as used in gates 3 through 6, it has much more statistical variation since it is derived from a least squares fit to the slope of a curve passing through each of the individual count gates. It is primarily statistically sensitive, not to the total of the counts in the gates but rather to the potentially low count rates in gates 5 and 6 which are far from the neutron burst. The gates 3 through 6 count rate curve is a much more repeatable curve than the processed $\Sigma_F$ since it a direct measure of thousands of counts per second summed for all the gates used to compute $\Sigma_F$. A $\Sigma$ measurement based on a statistically superior overall count rate measurement, even when unfiltered, should have adequate repeatability for direct use in thin bed analysis. Several wells have been analyzed over intervals where the borehole conditions did not change significantly and a correlation between the gate 3 through 6 count rate and $\Sigma_F$ has been observed. For example, in FIG. 5, a cross-plot of the short spaced detector gates 3 through 6 count rate versus $\Sigma_F$ in an interval with constant borehole conditions is illustrated. A general function of the form is given in Equation 3:

$$\Sigma_F = f(G3-6) + C_O \tag{3}$$

where $\Sigma_F$ is the conventionally derived, decay based formation capture cross section; $C_o$ is a normalization parameter; and $f(G3-6)$ represents a generalized function of the gate 3 through 6 count rates.

Figure 6:
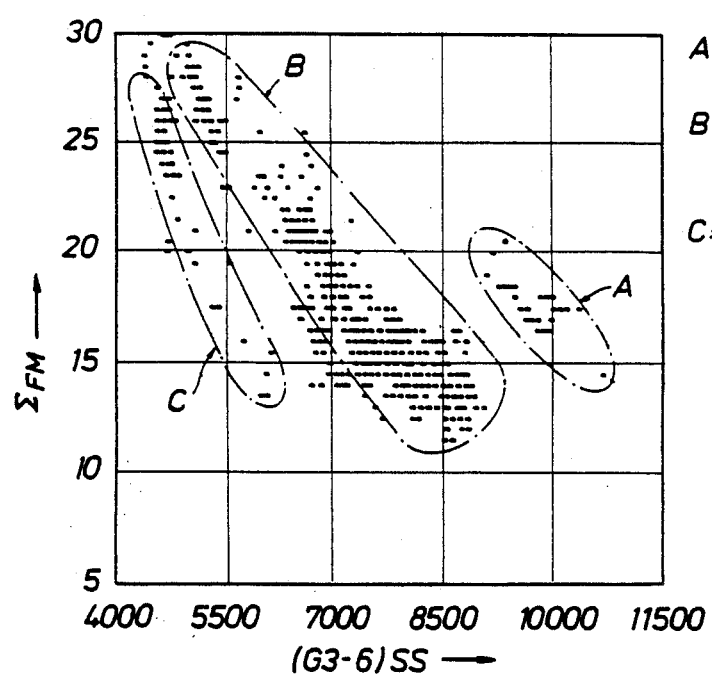
FIG. 6 is a cross plot showing short space gate 3 through 6 count rates versus $\Sigma_F$ in an interval having variable borehole conditions.

Unfortunately, the gate 3 through 6 count rates also vary with changes in borehole conditions and the neutron generator output. A crossplot is shown in FIG. 6 which is an expansion of the depth interval plotted in FIG. 5. In FIG. 6, the borehole fluid changed from brine in the bottom (the portion labeled trend A) to a mixture of brine and oil, labeled trend B. The well logging instrument started in 7 inch casing and came into a $2\frac{7}{8}$ inch tubing with brine in the casing tubing anulus, see trend C. These changes in borehole conditions are evidenced by the shift of the trends along the x-axis of FIG. 6. A normalization scheme to compensate for the non-$\Sigma$ induced count rate changes has been developed and uses the normally filtered $\Sigma_F$ and gate 3 through 6 count rate data to solve for the slowly varying parameter $C_o$ as follows:

$$C_O = \Sigma_F - f(G3-6) \tag{4}$$

This normalization parameter is then used in Equation 3 with the unfiltered (quarter foot) gate 3 through 6 count rate data to perform the computation of a high resolution formation cross section. The output from this process is labeled $\Sigma_{HR}$ which has roughly the precision of the standard filtered $\Sigma_F$ log and which has a response to thin bedding similar to the $\Sigma_F$ derived from the unfiltered data which would otherwise have a high statistical variation without this unique normalization procedure. Formation diffusion effects can be compensated for during the normalization process since the standard diffusion corrected $\Sigma_F$ may be used as the filtered base for data normalization. Alternatively, diffusion effects can be corrected after the normalization process if the $\Sigma_F$ used in the normalization procedure is taken directly from the short spaced and/or long spaced formation decay component(s). Effects on $\Sigma_{HR}$ from direct borehole counts are reduced both by considering data only in gates 3 through 6 where the borehole counts are greatly reduced and also because the $\Sigma_F$ from the two exponential model of Equation 1 has only minimal borehole sensitivity. The actual selection of the specific gates used, however, is not critical so long as there is a good correlation between the selected count rate and the measured $\Sigma_F$. In addition, the $\Sigma_F$ used in the normalization procedure does not necessarily have to be derived using the technique of U.S. Pat. No. 4,409,481.

Any conventionally produced decay based $\Sigma$ may be employed.

It is recognized that $\Sigma_{HR}$ changes caused by sudden anomalous temporary changes in the unfiltered gate 3 through 6 count rates due to packers located in the borehole, casing collars, etc. may not be adequately normalized using this procedure. This could create unusual $\Sigma_{HR}$ logs across depths containing such anomalies. To reduce these effects in the high resolution $\Sigma_{HR}$ presentation, we have chosen to place checks and bounds on $\Sigma_{HR}$, based on the computed statistical uncertainty in the unfiltered decay based $\Sigma_F$, and in the rate of change of $\Sigma_{HR}$ with depth. The computed $\Sigma_{HR}$ is compared to the $\Sigma_F$ computed conventionally from the unfiltered count rate decay data. These two $\Sigma$'s will have the same vertical resolution, but the decay based $\Sigma_F$ will be more statistical, as discussed earlier. Therefore $\Sigma_{HR}$ should agree with $\Sigma_F$ to within the statistics of $\Sigma_F$ (unfiltered). We have defined an operator selected criterion for their comparison. If $\Sigma_{HR}$ falls within two standard deviations (selectable) of the unfiltered $\Sigma_F$, the $\Sigma_{HR}$ is output. If $\Sigma_{HR}$ falls outside the statistical bound, then $\Sigma_F$ (or a minimally filtered $\Sigma_F$) is substituted for $\Sigma_{HR}$ over the interval where the two disagree, the assumption being that $\Sigma_{HR}$ is responding incorrectly to a borehole anomaly or generator output fluctuation, neither of which effects $\Sigma_F$ (unfiltered). Realistic bounds have also been placed on the maximum rate of change of the computed $\Sigma_{HR}$ as a function of depth (3.0 cu/0.25 ft.), to limit anomalies not trapped by this statistical comparison process. It may be desirable to indicate on the log as a quality control feature the intervals where these checks and bounds have been exceeded.

Referring now to FIG. 7, the high resolution $\Sigma$ processing technique is illustrated in a flow diagram. This flow diagram is in the nature of a macro diagram illustrating the broad principles of the technique. Upon entry, the entire desired depth interval log is recomputed at block 71 conventionally with both normal filtering and no filtering using the raw telemetry data as input. Of course, if this data were recorded on the real time log and stored on tape, this step would not be necessary. The output from the process includes both filtered and unfiltered gates 3-6 count rates from each detector and $\Sigma_F$ curves. Control is then passed to block 72 in which the high resolution algorithm is calibrated over a selected depth interval. To perform this calibration, a log analyst chooses from either the short or long spaced gates 3-6 count rate and selects a $\Sigma_F$ computed directly from either detector or from the diffusion corrected $\Sigma_F$ to make the calculations. Borehole conditions should be consistent across the calibration well section, and the $\Sigma_F$ and gate 3 through 6 count rate curve should show good dynamic range for that section. The filtered gate 3 through 6 count rate data and the filtered $\Sigma_F$ data computed in the normal thermal multigate decay log manner are then used for the calibration interval to determine the best fit calibration coefficients in f(G3−6), Equation 3, using a standard error minimization routine. For quality control, these coefficients and a calculated fit error can be displayed for the log analyst to verify that the calibration is valid before continuing. Control is then passed to the block 73 in which a standard deviation is computed for the unfiltered $\Sigma_F$. $\Sigma_{HR}$ is also computed over the entire depth interval in the well using the unfiltered gate 3-6 count rates in an algorithm according to Equation 3, as calibrated in block 72, and a normalization factor $C_0$ computed for each depth increment from the filtered gate 3-6 count rate and $\Sigma_F$ using Equation 4. These $\Sigma_{HR}$ computations are made for each successive depth increment using the techniques previously discussed. A rate of change limit is applied to $\Sigma_{HR}$ to reduce any unwanted anomaly spikes not handled by the standard deviation check, which is also conducted as discussed earlier using $\Sigma_{HR}$, $\Sigma_F$ (unfiltered) and the standard deviation in $\Sigma_F$ (unfiltered) as inputs.

Finally, control is transferred to block 74 in which environmental corrections (and possibly also formation diffusion corrections) to the high resolution $\Sigma_{HR}$ and unfiltered porosity ratios can be applied. If borehole parameters are specified then the same procedures may be used in correcting the $\Sigma_{HR}$ and unfiltered $R_{N/F}$ as are used in correcting the conventionally derived and filtered $\Sigma_F$ and $R_{N/F}$ curves of the thermal multigate decay process, where the $R_{N/F}$ is a porosity ratio of count rates in gates 3 through 6 taken from the near and far detectors over the same depth interval. This environmental procedure is outlined in Paper SS, 1988 SPWLA Symposium Transactions, entitled "Obtaining Intrinsic Formation Capture Cross Section With Pulsed Neutron Capture Tools".

A limitation of the foregoing technique for determining high resolution $\Sigma$ is that artificial thin beds can be created by count rate anomalies. Casing collars, packers, neutron generator output fluctuations, etc. can produce brief count rate changes in the gate 3 through 6 count rates which are not related to formation cross section effects. These effects are not completely normalizable using the procedures and the bounding limits and checks described earlier. However, these anomalies will generally cause $\Sigma_{HR}$ deflection toward higher neutron cross sections. Experienced log analysts will recognize such anomalous behavior when it occurs, especially if other logs such as a casing collar log are available, and to take it into account in interpreting the logs over the depth intervals in question.

The foregoing descriptions may make other alternative techniques for obtaining high resolution $\Sigma$ cross sections apparent to those of skill in the art. It is the aim of the appended claims to cover all such changes and modifications as fall within the true spirit in scope of the invention.

What is claimed is:

1. A method for measuring high vertical resolution earth formation thermal neutron capture cross sections of earth formations in the vicinity of a well borehole, comprising the steps of:
   (a) repetitively emitting in a well borehole relatively short duration bursts of fast neutrons which are rapidly moderated by interaction with nuclei of materials in the borehole and surrounding earth formations and slowed to thermal energy, creating repetitive time dependent distributions of the thermal neutron population in the borehole and surrounding earth formations;
   (b) detecting, as a function of depth, in the borehole during time intervals between said repetitive bursts of fast neutrons, radiations representative of the thermal neutron population in the borehole and surrounding earth formations in at least two time subintervals subsequent to each burst of fast neutrons and generating at least two count rate signals representative of said thermal neutron populations during said at least two time subintervals;

(c) filtering said count rate signals to reduce statistical fluctuations in subsequent computations;

(d) combining said at least two filtered count rate signals according to a predetermined relationship to obtain a neutron die-away based measurement of the formation thermal neutron capture cross section $\Sigma_F$;

(e) selecting at least one of said at least two filtered gate count rate signals, or a sum of selected filtered count rate signals, to obtain a combined gate count rate signal G, and using a predetermined functional relationship f(G) between G and the previously determined filtered formation capture cross section $\Sigma_F$ to obtain as a function of depth a normalization parameter $C_o$;

(f) obtaining a combined count rate signal G' from said at least one of said at least two count rate signals in step (b), prior to filtering in step (c), in a manner analogous to obtaining filtered count rate signal G;

(g) determining from f(G') and the normalization parameter $C_o$ in step (e) a high resolution thermal neutron capture cross section $\Sigma_{HR}$ with the approximate vertical resolution of the count rate signals in step (b); and (h) recording $\Sigma_{HR}$ as a function of borehole depth to produce an enhanced depth resolution measurement of thermal neurtron capture cross section, relative to the $\Sigma_F$ measurement in step (d).

2. The method of claim 1 wherein the cross section $\Sigma_{HR}$ is determined according to a functional relationship of the general form $$\Sigma_{HR}=f(G')+C_o$$

where f(G¹') is an empirically derived predetermined functional relationship and $C_o$ is said normalization parameter.

3. The method of claim 2 wherein the $C_o$ normalization parameter is determined according to a functional relationship of the general form of $$C_o=\Sigma_F-f(G)$$

where f(G) was previously defined and $\Sigma_F$ is the neutron die away based formation cross section at the corresponding depth as determined by combining said at least two filtered count rate signals.

4. The method of claim 1 wherein all steps are performed for count rate signals taken at each of two detectors, a near detector and a far detector, spaced longitudinally from the source of said repetitive neutron bursts, and wherein the two resulting $\Sigma_{HR}$ measurements are combined with information about formation porosity to obtain a formation diffusion corrected high resolution formation cross section.

5. The method of claim 1 wherien steps (a) through (d) are performed for two detectors spaced different distances from the source and steps (e) through (g) are performed using the $\Sigma_F$ and G for the far detector to determine $C_o$, which is used with the combined gate count parameter (G') from the near detector to determine said $\Sigma_{HR}$ measurement.

6. The method of claim 1 wherein steps (a) through (d) are performed for two detectors spaced different distances from the source and steps (e) through (g) are performed using $\Sigma_F$ and G from the near detector to determine $C_0$ which is used in combination with G' from the far detector to determine $\Sigma_{HR}$.

7. The method of claim 1 wherein said predetermined functional relationship in step (e) is parameterized from filtered $\Sigma_F$ and G values observed over an interval in the well with reasonably constant borehole conditions.

8. The method of claim 1 wherein said predetermined functional relationship in step (e) is parameterized from unfiltered $\Sigma_F$ and G' values observed over an interval in the well with reasonably constant borehole conditions.

9. A method for measuring high vertical resolution earth formation thermal neutron capture cross sections of earth formations in the vicinity of a well borehole, comprising the steps of:

(a) repetitively emitting in a well borehole relatively short duration bursts of fast neutrons which are rapidly moderated by interaction with nuclei of materials in the borehole and surrounding earth formations and slowed to thermal energy creating repetitive bursts of thermal neutron population in the borehole and surrounding earth formation;

(b) detecting, in the borehole during a time interval between said repetitive bursts of fast neutrons, radiations representative of the thermal neutron population in the borehole and surrounding earth formations in at least six time subintervals subsequent to a burst of fast neutrons and generating at least six count rate signals, G1, G2, G3, G4, G5, and G6, representative of said thermal neutron populations during said at least six time subintervals;

(c) combining said at least six count rate signals according to an iterative fitting technique in which exponential relationships are assumed to exist for a borehole and a formation component of thermal neutron capture cross section to simultaneously obtain measurement signals representative of $\Sigma_F$ the formation component and $\Sigma_B$ the borehole component of thermal neutron capture cross section;

(d) combining at least two of said gate count rate signals to obtain a combined gate count rate parameter (G3−6) and using a predetermined functional relationship between (G3−6) defined as f(G3−6) and the previously determined formation component of capture cross section $\Sigma_F$ to obtain a normalization parameter $C_o$;

(e) determining as a function of the combined gate count rate parameter (G3−6) and the normalization parameter $C_o$ a high resolution thermal neutron capture cross section parameter $\Sigma_{HR}$; and (f) recording $\Sigma_{HR}$ as a function of borehole depth to produce an enhanced depth resolution measurement of thermal neutron capture cross section.

10. The method of claim 9 wherein the parameter $\Sigma_{HR}$ is determined according to a functional relationship of the general form $$\Sigma_{HR}=f(G3-6)+C_o$$

where f(G3−6) is a predetermined functional relationship empirically derived and $C_o$ is said normalization parameter.

11. The method of claim 10 wherein $C_o$ the normalization parameter is determined according to a functional relationship of the general form of $$C_o=\Sigma_f-f(G3-6)$$

where f(G3−6) is as previously defined and $\Sigma_F$ is the formation component at the corresponding depth as determined by combining said at least two count rate signals.

12. The method of claim 11 wherein steps (a) through (c) are performed for count rate signals taken at each of two detectors, a near detector and a far detector, spaced longitudinally from the source of said repetitive neutron bursts.

13. The method of claim 12 wherein steps (d) and (e) are performed using the $\Sigma_F$ for the far detector to determine $C_o$ which is used with the combined gate count parameter (G3−6) from the near detector to define said normalization parameter.

14. The method of claim 13 wherein step (c) is performed with gate count rate data from the near detector which has not been statistically filtered.

* * * * *